United States Patent [19]
Takahashi

[11] Patent Number: 6,062,464
[45] Date of Patent: *May 16, 2000

[54] METHOD OF BRAZING ALUMINIUM WITH FLUX AND A FURNACE THEREFOR

[75] Inventor: Susumu Takahashi, Yokohama, Japan

[73] Assignee: Kanto Yakin Kogyo K.K., Japan

[*] Notice: This patent is subject to a terminal disclaimer.

[21] Appl. No.: 09/135,450

[22] Filed: Aug. 17, 1998

[30] Foreign Application Priority Data

Sep. 2, 1997 [JP] Japan ................................. 9-276354

[51] Int. Cl.⁷ .............................. B23K 1/20; B23K 31/02; B23K 35/24
[52] U.S. Cl. ......................... 228/214; 228/217; 228/225
[58] Field of Search ................................... 228/214, 217, 228/225

[56] References Cited

U.S. PATENT DOCUMENTS

| | | | |
|---|---|---|---|
| 5,897,326 | 4/1999 | Eldridge et al. | 438/14 |
| 5,911,357 | 6/1999 | Takahashi | 228/214 |

*Primary Examiner*—Patrick Ryan
*Assistant Examiner*—Cecilia Newsome
*Attorney, Agent, or Firm*—Shlesinger, Fitzsimmons & Shlesinger

[57] ABSTRACT

So that the brazing of aluminium parts with the use of a flux can be made effectively without employment of a corrodible metallic muffle, furnace inner walls made of carbonaceous refractory sheets are utilized as a brazing space, and an inert atmosphere supplied into this space is protected from the air by furnace outer walls which are made of steel sheets to form a furnace shell and which are made hermetical against the air.

3 Claims, 1 Drawing Sheet

METHOD OF BRAZING ALUMINIUM WITH FLUX AND A FURNACE THEREFOR

BACKGROUND OF THE INVENTION

This invention relates to a method of brazing aluminium or aluminium alloy parts, and more particularly the method of brazing them with a flux.

The invention also relates to an atmosphere furnace which can advantageously be employed for such brazing method.

When iron, copper, or their alloys are put into a furnace employing as its atmosphere a reductive gas such as hydrogen and carbon monoxide, and are subjected to a high temperature, they are deoxidized. Therefore, the brazing of such metals within such atmosphere furnace does not need a flux.

On the other hand, as aluminium and its alloys are not deoxidized even under an extremely low partial pressure of oxygen, they can not be brazed by heating them within the atmosphere furnace of the kind mentioned above. Accordingly, their brazing has been made not by an atmosphere but by the use of a flux.

Conventional brazing may be summarized that the brazing of iron, copper, or their alloys by heating them within a furnace employs a reductive atmosphere but does not need a flux, while the brazing of aluminium and its alloys does employ a flux but does not need a reductive atmosphere.

On the contrary to the above-summarized conventional brazing methods, it becomes lately useful or essential for brazing, with a flux, aluminium and its alloys to employ an inert atmosphere, too. This is in order to braze aluminium parts with a minimum amount of flux and effectively without causing environmental pollution.

To wit, as those fluxes which are commonly used for brazing aluminium parts and have a melting point of 500–550° C., are made from fluorine compounds such as aluminium fluoride, potassium tetrafluoroaluminate, sodium fluoride, and so on, or alkali metal chloride containing one or more fluorine compounds, they are soluble only slightly in water, and accordingly it needs a large volume of water to wash off them. In order to reduce the volume of water for washing off them or to eliminate a washing step in view of environmental pollution, they must be used as minimum as possible.

While the reduction of use of fluxes can be against environ-mental pollution, especially water pollution, it can be economic too. It can yield fine aluminium articles with little flux residues. It can prevent a furnace from being eroded much by fluxes.

However, fluxes which have been applied over aluminium parts thinly in order to minimize them, are readily oxidized at a high temperature. Oxidized fluxes of the kind mentioned above will have a melting point more than 1,000° C. Since a melting point of Al—Si system solders which are commonly used in aluminium brazing, is about 500–630° C., and since the aluminium or aluminium alloy brazing is conducted at about 580–660° C., the oxidized fluxes having the melting point as high as 1,000° C. are unserviceable. They will induce secondary oxidation of aluminium or aluminium alloy parts, to which they have been applied.

Consequently, even in the brazing of aluminium or aluminium alloy parts, heating them under an inert atmosphere becomes essential, as described above, in order to prevent fluxes from oxidizing. In practice, a hermetic metallic muffle filled up with nitrogen gas of a high purity is installed in a furnace, and the aluminium or aluminium alloy parts are brazed with a flux under an inert atmosphere within the metallic muffle.

While such metallic muffle protects its atmosphere from an outer disturbance, electric heating elements which are installed in a space between the muffle and inner furnace walls, are protected by the muffle from fluxes scattered therein, whereby the muffle prevents the heating elements from troubling electrically on account of the fluxes. Although metallic muffles work so, it is not easy to replace them when they are damaged by fluxes and so on. As metallic muffles employed today are as long as 10m, it is laborious to install or replace them.

It is therefore an object of this invention to provide a method of continuously brazing aluminium or aluminium alloy parts with the use of fluxes and under an inert atmosphere such as nitrogen within a furnace which does not employ any metallic muffle, and to provide also the furnace which can carry out the method well.

SUMMARY OF THE INVENTION

In this invention, the air is excluded from an inert atmosphere which is within a furnace and prevents the oxidation of aluminium or aluminium alloy parts assembled and applied with solders and fluxes for brazing, particularly the oxidation of the fluxes, not by the aforementioned kind of conventional hermetic metallic muffle installed within the furnace, but by metallic outer walls which are outside of furnace inner walls through insulations to form hermetic shells, whereby the inert atmosphere introduced directly into a space within the furnace inner walls and filling up the space is protected from the air.

In this invention, apparatuses, devices, and tools which penetrate through the metallic outer shell walls and furnace inner walls and are installed so as to open or face in the furnace inner walls, such as for example atmosphere gas supplying tubes, thermometers, heating elements, atmosphere observation meters, and the like, are also provided hermetically against the air.

Since inorganic bases contained in the aforementioned kind of fluxes severely erode oxide refractories, it is preferable to build the furnace inner walls by carbonaceous refractories which stand well against such erosion. And, it is preferable also to have a bottom of furnace inner walls, viz., the hearth divided into several pieces transversely to the longitudinal direction of the hearth, so that the divided hearth may be pushed or drawn out longitudinally for inspecting it or replacing required pieces of the hearth.

THE DRAWINGS

FIG. 1 is an explanatory sectional view of an essential part of a continuous atmosphere furnace which can advantageously be employed to practice this invention method.

DETAILED DESCRIPTION OF THE PREFERRED EMBODIMENTS

Figure 1:
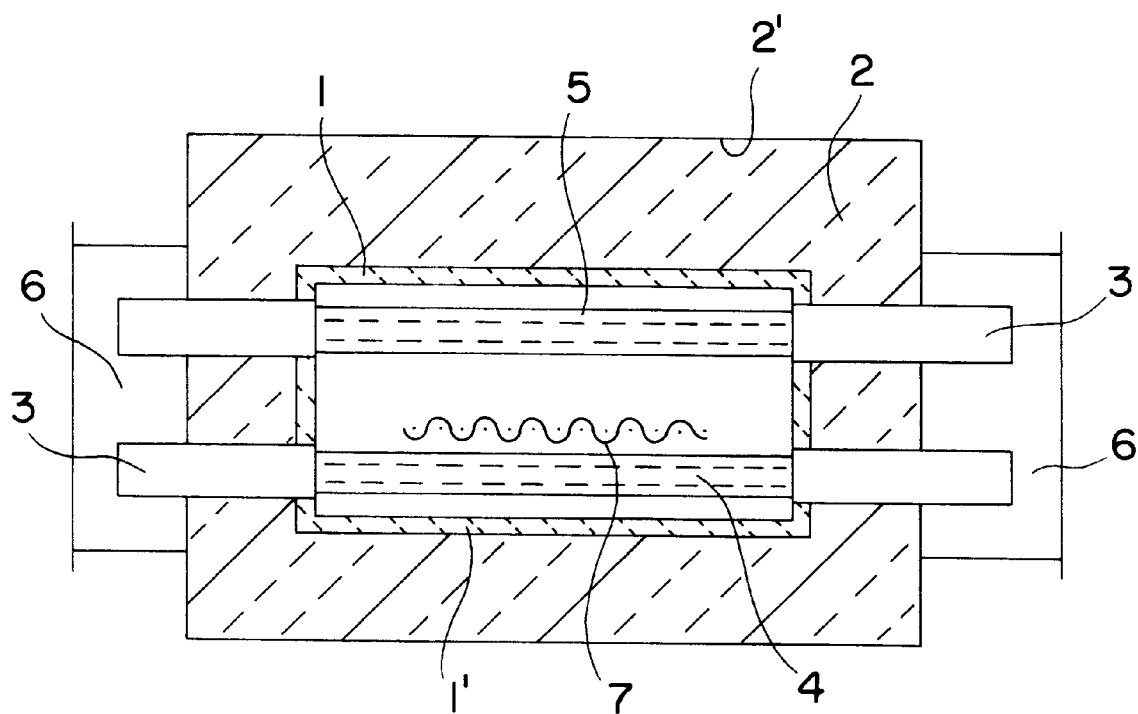

First, a furnace which can advantageously be employed for practicing the method of this invention, is explained with reference to FIG. 1.

Furnace inner walls 1 which are sheets made by sintering pure graphite, one of carbonaceous materials, form a tunnellike space which extends along a longitudinal direction of the furnace and is rectangular in its cross-section, and in which a brazing operation is made. The furnace inner walls indicated by 1' are bottom walls which form a hearth of the furnace and are divided transversely to the longitudinal direction of the furnace into a desired number of pieces.

Steel sheets 2' which form a furnace shell located outside of the furnace inner walls 1 with insulations 2 therebetween, are made hermetical against the air. Numerals 3 indicate a pair of electric resistant heaters having heating elements 4 located within the furnace inner walls 1 and also having outer ends which penetrate through the furnace shell sheets 2' and are hermetically sealed against the air by a hermetic boxes 6. The heating elements 4 of the heaters 3 are covered by ceramic sleeves 5 so that their insulation shall not be damaged by fluxes scattering within the furnace inner walls. Ceramics may be replaced by metallic materials and so on which are anticorrosive against fluxes.

A conveyor 7 which circulates through the rectangular space within the furnace inner walls 1 in the longitudinal direction of the furnace for carrying aluminium parts, is preferably made by carbonaceous materials.

Apparatuses which penetrate through the shell sheets 2' and furnace inner walls 1 and are installed so as to open or locate within the furnace inner walls, such as atmosphere supplying tubes, thermometers, atmosphere observation meters, and the like which are not shown in the drawing, are also made hermetical against the air, similarly to the heaters 3.

EXAMPLE 1

Directly into a space (650 mm in width, 6,000 mm in length, and 180 mm in effective height) made by the furnace inner walls 1 of the above-described continuous atmosphere furnace, a nitrogen gas of a high purity was sent by 33 m$^3$/hour from an atmosphere supplying tube open at its central upper portion (not shown). At the same time, into the hermetical sealing boxes 6 too, the nitrogen gas was charged. The space made by the furnace inner walls 1, that is, a heating chamber was kept at 600° C. by the heaters 3.

Into the heating chamber, assemblies of aluminium parts were sent by the conveyor 7 at a rate of 60 assemblies/hour. Each assembly was adhered with 60 g of a flux made from alkali metal chloride containing fluorine compounds and having a melting point of 547° C. and was coated by an Al—Si system brazing sheet of a melting point of 590° C.

Although the nitrogen gas supplied into the heating chamber was gradually discharged to the outside from inlet and outlet openings, air did not enter into the chamber, and the furnace atmosphere was always kept at an oxygen amount of 25–55 ppm. Brazing was conducted very well for a long period of time.

In this invention, without employing a corrodible metallic muffle, the brazing with a flux of aluminium or aluminium alloy parts is performed under a desired atmosphere, whereby the brazing becomes economic in its operation and maintenance. It is a characteristic feature of this invention that as hermetic means which shut the furnace from the air, are located remotely from its heating chamber, the means shall not be subjected to a high temperature and will not be eroded by fluxes. As they are furnace shells and sealing boxes attached to the shells, materials and structures by which they are made, can be selected rather freely, and their maintenance will be comparatively easy.

I claim:

1. A method for continuously brazing aluminium or aluminium alloy parts with the use of a flux and under a furnace atmosphere, which comprises brazing the parts under the furnace atmosphere in an elongated space formed by carbonaceous refractory furnace inner walls, and protecting the atmosphere not to be in contact with the air by surrounding the furnace inner walls with metallic furnace outer walls which are made hermetic against the air and by hermetically installing to the furnace outer walls those heating and other elements, parts of which extend into the elongated space.

2. The method as claimed in claim 1, in which covering the parts of the elements which are extended into the elongated space, by materials which are anticorrosive against the flux.

3. The method as claimed in claims 1 or 2, in which making bottom walls of the carbonaceous refractory furnace inner walls as a hearth, and dividing the hearth transversely to a longitudinal direction of the furnace into a desired number of pieces.

* * * * *